(12) United States Patent
Chen et al.

(10) Patent No.: US 11,698,815 B2
(45) Date of Patent: Jul. 11, 2023

(54) METHOD FOR RESOURCE ALLOCATION AND RELATED PRODUCTS

(71) Applicant: GUANGDONG OPPO MOBILE TELECOMMUNICATIONS CORP., LTD., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 267 days.

(21) Appl. No.: 15/931,036

(22) Filed: May 13, 2020

(65) Prior Publication Data

US 2020/0272518 A1 Aug. 27, 2020

Related U.S. Application Data

(63) Continuation of application No. PCT/CN2018/118624, filed on Nov. 30, 2018.

(30) Foreign Application Priority Data

Dec. 6, 2017 (CN) .......................... 201711277765.X

(51) Int. Cl.
*G06F 9/50* (2006.01)
*G06F 9/54* (2006.01)
*H04M 1/72454* (2021.01)

(52) U.S. Cl.
CPC .......... *G06F 9/5016* (2013.01); *G06F 9/5027* (2013.01); *G06F 9/547* (2013.01); *H04M 1/72454* (2021.01)

(58) Field of Classification Search
CPC ...... G06F 9/5016; G06F 9/5027; G06F 9/547; H04M 1/72454
See application file for complete search history.

(56) References Cited

U.S. PATENT DOCUMENTS 7,761,885 B2 * 7/2010 Labrou .................. G06F 9/465
 719/330
8,555,282 B1 * 10/2013 Kahn .................... G06F 9/5005
 718/100
(Continued)

FOREIGN PATENT DOCUMENTS

CN 103984538 A 8/2014
CN 104731304 A 6/2015
(Continued)

OTHER PUBLICATIONS

Extended European search report issued in corresponding European application No. 18885559.7 dated Jan. 15, 2021.
(Continued)

*Primary Examiner* — Emerson C Puente
*Assistant Examiner* — Jonathan R Labud
(74) *Attorney, Agent, or Firm* — Young Basile Hanlon & MacFarlane, P.C.

(57) ABSTRACT

A method apparatus for resource allocation and related products are provided. The method includes the following. An operating system acquires at least one system event associated with a target application in response to detecting that the target application is running in a foreground of the mobile terminal. The operating system identifies an internal running scenario of the target application according to the at least one system event. The operating system acquires a strategy for performance improvement corresponding to the internal running scenario. The operating system adjusts allocation of system resources of the target application according to the strategy for performance improvement.

7 Claims, 6 Drawing Sheets

(56) References Cited

U.S. PATENT DOCUMENTS

| | | | | |
|---|---|---|---|---|
| 2009/0174680 A1* | 7/2009 | Anzures | ............... | G06F 3/0482 |
| | | | | 345/173 |
| 2011/0161076 A1 | 6/2011 | Davis et al. | | |
| 2012/0159090 A1 | 6/2012 | Andrews et al. | | |
| 2013/0135212 A1* | 5/2013 | Cheng | ............... | G06F 3/04886 |
| | | | | 345/168 |
| 2013/0138816 A1 | 5/2013 | Kuo et al. | | |
| 2015/0130761 A1 | 5/2015 | Hong et al. | | |
| 2016/0100322 A1* | 4/2016 | Ekambaram | ....... | G06F 11/3466 |
| | | | | 455/418 |

FOREIGN PATENT DOCUMENTS

| | | |
|---|---|---|
| CN | 105677477 A | 6/2016 |
| CN | 106095592 A | 11/2016 |
| CN | 107426432 A | 12/2017 |
| CN | 108037999 A | 5/2018 |
| EP | 2874063 A2 | 5/2015 |
| EP | 2950203 A1 | 12/2015 |
| EP | 3187995 A1 | 7/2017 |
| WO | 2016041190 A1 | 3/2016 |

OTHER PUBLICATIONS

International search report issued in corresponding international application No. PCT/CN2018/118624 dated Feb. 27, 2019.
English translation of the Reject decision issued in corresponding CN application No. 201711277765.X dated May 7, 2020.
English translation of the second office action issued in corresponding CN application No. 201711277765.X dated Sep. 27, 2019.
English translation of the third office action issued in corresponding CN application No. 201711277765.X dated Dec. 26, 2019.
English translation of the first office action issued in corresponding CN application No. 201711277765.X dated May 28, 2019.
Indian Examination Report for IN Application 202017026211 dated Nov. 11, 2021. (8 pages).
Communication pursuant to Article 94(3) EPC for EP Application 18885559.7 dated May 10, 2022. (7 pages).

* cited by examiner

METHOD FOR RESOURCE ALLOCATION AND RELATED PRODUCTS

CROSS-REFERENCE TO RELATED APPLICATION(S)

This application is a continuation of International Patent Application No. PCT/CN2018/118624, filed on Nov. 30, 2018, which claims priority to Chinese Patent Application No. 201711277765.X, filed on Dec. 6, 2017, the entire disclosure of both of which are hereby incorporated by reference in their entireties.

TECHNICAL FIELD

This disclosure relates to the technical field of mobile terminals, and particularly to a method for resource allocation and related products.

BACKGROUND

With the rapid development of technologies relating to smart phones, an increasing number of applications are installed in mobile phones of users, such as reading applications, payment applications, game applications, music applications, etc. People's daily life is closely linked with the mobile phone.

SUMMARY

Implementations provide a method for resource allocation and related products.

According to a first aspect, a method for resource allocation is provided in implementations. The method is applicable to a mobile terminal and the mobile terminal has an operating system and at least one application. The method is performed by the operating system and the method includes the following. In response to detecting that a target application is running in a foreground of the mobile terminal, at least one system event associated with the target application is acquired. An internal running scenario of the target application is identified according to the at least one system event. A strategy for performance improvement corresponding to the internal running scenario is acquired. Allocation of system resources of the target application is adjusted according to the strategy for performance improvement.

According to a second aspect, a mobile terminal is provided. The mobile terminal includes at least one processor and at least one memory. The at least one memory is coupled to the at least one processor and stores at least one computer executable instruction thereon which, when executed by the at least one processor, causes the at least one processor to execute the method of the first aspect.

According to a third aspect, a non-transitory computer readable storage medium is provided in implementations. The non-transitory computer readable storage medium is configured to store a computer program which, when executed by a processor, causes the processor to execute the method of the first aspect.

BRIEF DESCRIPTION OF DRAWINGS

The following briefly introduces accompanying drawings required for illustrating the implementations.

DETAILED DESCRIPTION

In order for those skilled in the art to better understand technical solutions, in the following, technical solutions of implementations will be described clearly and completely with reference to accompanying drawings in implementations. Apparently, implementations described hereinafter are merely some rather than all implementations. All other implementations obtained by those of ordinary skilled in the art based on implementations without creative efforts shall fall within the protection scope.

The terms "first", "second", and the like used in the specification, the claims, and the accompany drawings are used to distinguish different objects rather than describe a particular order. In addition, the terms "include", "comprise", and "have" as well as variations thereof are intended for non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1A:
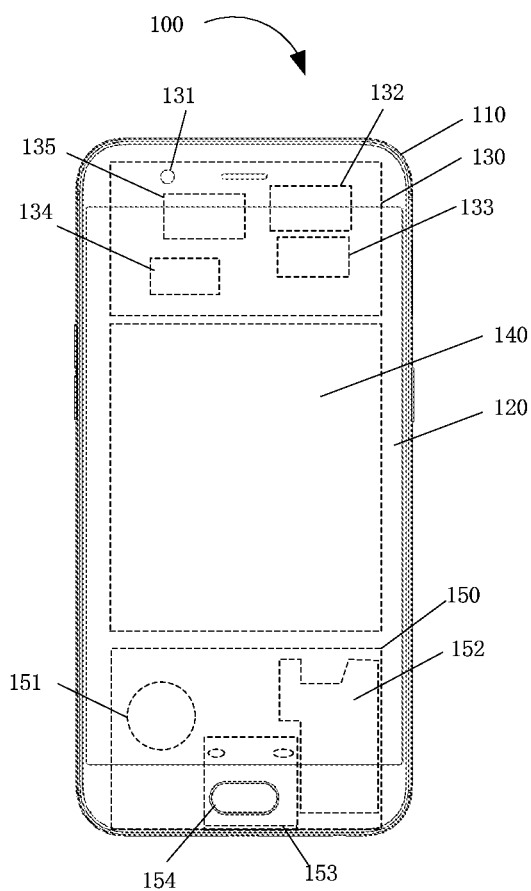
FIG. 1A is a schematic structural diagram illustrating a smart phone.

FIG. 1A is a schematic structural diagram illustrating a smart phone 100 according to implementations. The smart phone 100 includes: a housing 110, a touch display screen 120, a main board 130, a battery 140, and a sub-board 150. The main board 130 is provided with a front camera 131, a system on chip (SoC) (including an application processor and baseband processor) 132, a memory 133, a power management chip 134, a radio frequency system 135, and the like. The sub board is provided with an oscillator 151, an integrated sound cavity 152, a VOOC flash charging interface 153, and a fingerprint recognition module 154.

The SoC 132 is a control center of the smart phone and is configured to connect each part of the smart phone via various interfaces and lines. By running or executing software programs and/or modules stored in the memory 133 and calling data stored in the memory 133, the processor 134 can perform various functions of the smart phone and process data, so as to achieve overall monitoring of the smart phone. The SoC 132 can include one or more processing units. In an implementation, the SoC 132 can be integrated with an application processor and a baseband processor (baseband chip or baseband), and the like. The application processor is mainly configured to process an operating system(s), a user interface(s), an application(s), and the like. The baseband processor is mainly configured to process wireless communication. It can be understood that the baseband processor may not be integrated into the SoC 132 as well. The SoC 132 may be, for example, a central processing unit (CPU), a general-purpose processor, a digital signal processor (DSP), an application-specific integrated circuit (ASIC), and a field programmable gate array (FPGA), or other programmable logic devices, transistor logic devices, hardware components, or any combination thereof. Various example logical blocks, modules, and circuits described in conjunction with the disclosure may be achieved or implemented by the SoC 132. The SoC 132 can also be a combination of computing functions, for example, a combination of one or more micro-processors, a combination of a DSP and a micro-processor, and the like.

The memory 133 is configured to store software programs and modules. The SoC 132 is configured to perform various functions of the smart phone and process data by running or executing software programs and/or modules stored in the memory 133. The memory 133 can manly include a program storage area and a data storage area. The program storage area is configured to store the operating system, applications required by at least one function, and the like. The data storage area is configured to store data created according to usage of the smart phone and the like. In addition, the memory 133 may include a high-speed random access memory, and can further include a non-volatile memory, such as at least one magnetic disk memory, a flash memory, or other volatile solid-state memories. The memory 133 can be, for example, a random access memory (RAM), a flash memory, a read only memory (ROM), an erasable programmable ROM (EPROM), an electrically EPROM (EEPROM), a register, a hard disk, a mobile hard disk, a compact disc read-only memory (CD-ROM), or any other forms of storage medium known in the art.

Mobile terminals in implementations may include various handheld devices, in-vehicle devices, wearable devices, computing devices that have wireless communication functions or other processing devices connected to a wireless modem, as well as various forms of user equipment (UE), mobile stations (MS), terminal devices, and the like. For the convenience of description, the above-mentioned devices are collectively referred to as mobile terminals. An operating system involved in implementations is a software system for unified management of hardware resources and provides service interfaces to users.

Figure 1B:
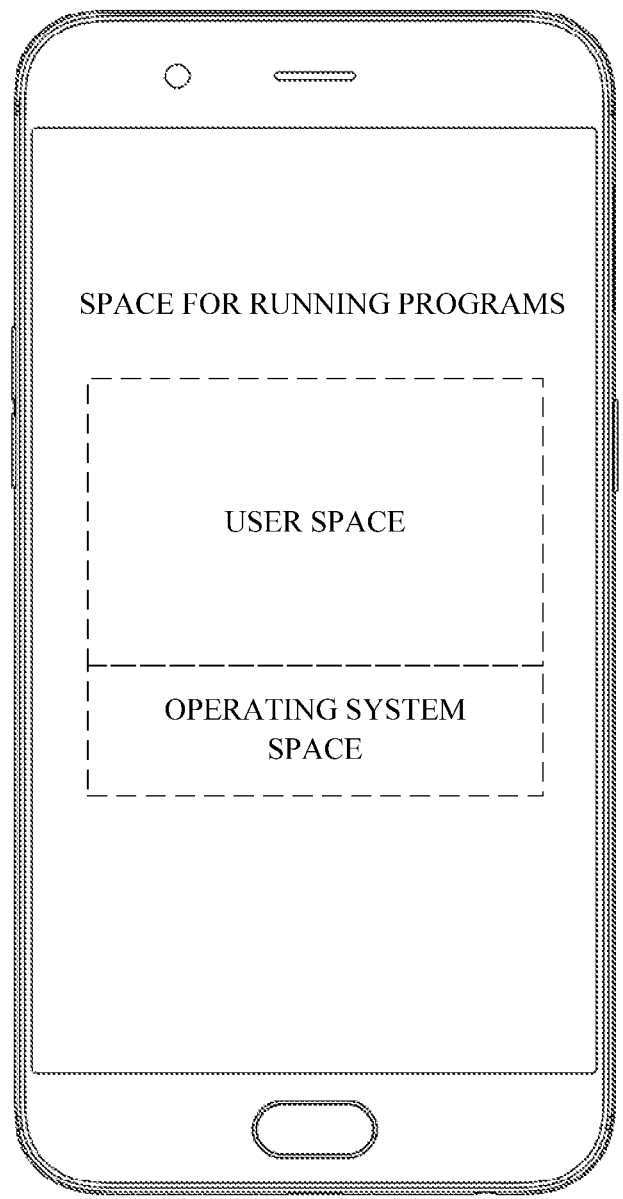
FIG. 1B is a schematic diagram illustrating a space for running programs of a smart phone.
Figure 1C:
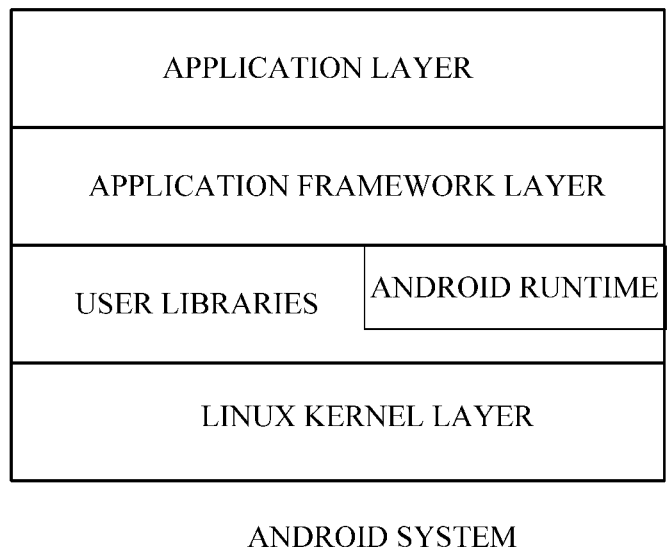
FIG. 1C is a schematic diagram illustrating a system architecture of an Android™ system.

FIG. 1B is a schematic diagram illustrating a space for running programs of a smart phone. A mobile terminal such as a smart phone generally has a space for running programs (program space for short, which is a place to install the operating system). The program space includes a user space and an operating system space. One or more applications, which are third-party applications installed on the mobile terminal, can run in the user space. An operating system of the mobile terminal runs in the operating system space. Examples of the operating system include but are not limited to an Android™ system, a mobile operating system iOS™ developed by Apple®, etc. As illustrated in FIG. 1C, the following describes the Android system runs on the mobile terminal as an example. In Android system, the user space includes an application layer of the Android system and the operating system space includes an application framework layer, user Libraries layer (including Libraries and Android RunTime), and Linux Kernel layer of the Android system. The application layer includes various applications directly interacting with a user, or service programs written in the Java language and running in the background, for example, programs for implementing common basic functions on smart phones, such as short messaging service (SMS), telephone dialing, picture viewers, calendars, games, maps, world wide web (Web) browsers, etc., as well as other applications developed by developers. The application framework layer provides a series of libraries required in developing Android applications, which can be used to reuse components as well as personalize extensions through inheritance. The Libraries and Android RunTime layer can support the application framework and provide services for various components in the Android system. The Libraries and Android RunTime layer include Libraries and Android RunTime. The Android RunTime includes a core library and a Dalvik virtual machine. The Linux kernel layer is configured to implement core functions such as hardware device driving, process and memory management, network protocol stacks, power management, wireless communication, and the like.

A process created by the third-party application initially runs in the user space. When the third-party application needs to perform operations such as sending data via a network, reading disk data, and the like, standard interface functions provided by the operating system such as "write" and "send" should be invoked. That is, a CPU invokes codes of the operating system space to perform operations requested by the user. As can be seen, the third-party application can only invoke functions provided by the operating system by invoking the standard interface functions provided by operating system. In addition, the operating system does not know what functions the third-party application is performing, the target application is unable to instruct the operating system to perform special operations, the operating system and the target application are independent from each other, so that the operating system cannot distinguish an internal running scenario of the target application, the operating system can only use a set of standard parameters to adapt internal running scenarios, and is unable to optimize performance with regard to the internal running scenario of the target application.

In view of the above, implementations provide a method for resource allocation for the target application of the mobile terminal. With regard to the method, when the operating system of the mobile terminal detects that a target application is running in a foreground of the mobile terminal, the operating system first acquires at least one system event associated with the target application. The operating system then identifies the internal running scenario of the target application according to the at least one system event. Thereafter, the operating system acquires a strategy for performance improvement corresponding to the internal running scenario. At last, the operating system adjusts allocation of system resources of the target application according to the strategy for performance improvement. According to implementations, allocation of system resources for the target application can be controlled by the mobile terminal in real time and more accurately.

The following describes the implementations in conjunction with the accompanying drawings.

Figure 2:
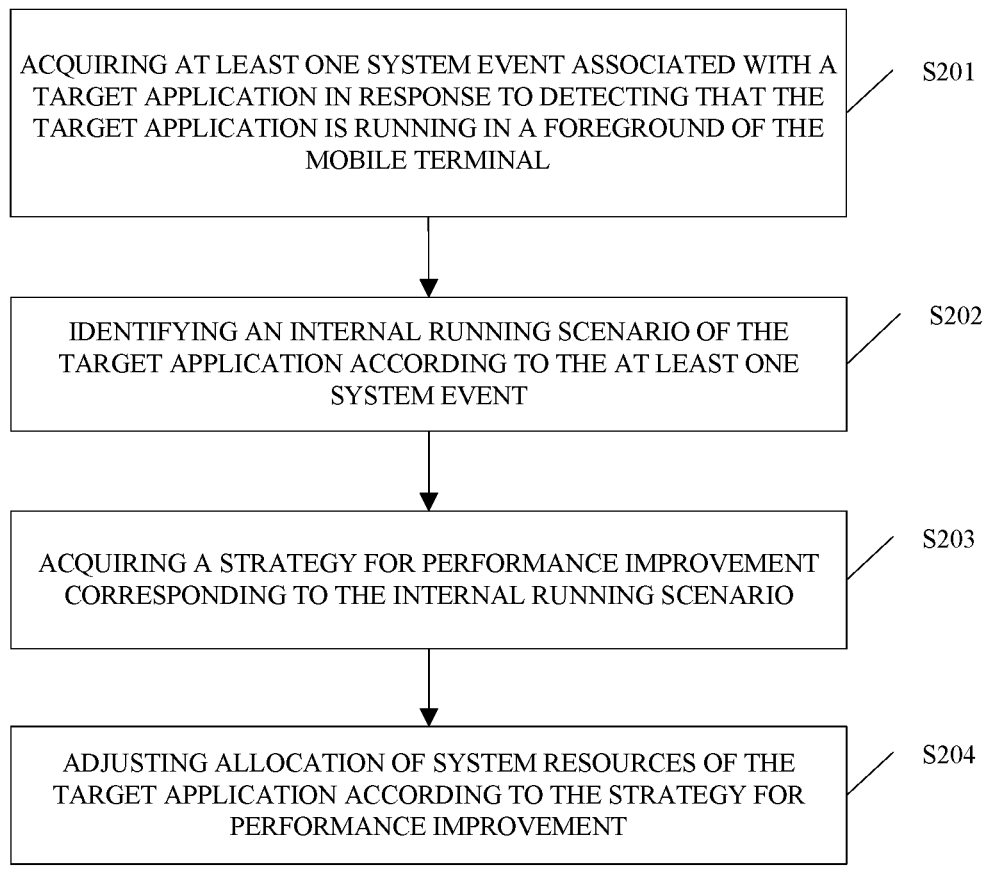
FIG. 2 is a schematic flow chart illustrating a method for resource allocation according to implementations.

FIG. 2 is a schematic flow chart illustrating a method for resource allocation in a mobile terminal according to implementations. The mobile terminal has an operating system and at least one application. As illustrated in FIG. 2, the method for resource allocation includes the following.

At S201, in response to detecting that a target application is running in a foreground of the mobile terminal, the operating system acquires at least one system event associated with the target application.

The target application refers to a third-party application installed in a user space of the mobile terminal. The third-party application may be, for example, a camera application, an instant messaging application, a game application, etc. The third-party application can be installed by a user, or pre-installed by a developer before the mobile terminal leaves the factory, which is not limited here.

The at least one system event includes at least one of the following: an event of touching a running interface of the target application, an event of switching screen states of a running interface of the target application, an event of pressing a preset physical key of the mobile terminal, a sensor event, or an event of calling an application programming interface (API). The sensor event includes at least one of: enabling a global position system (GPS) of the mobile terminal, enabling an acceleration sensor of the mobile terminal, or enabling a gravity sensor (G-sensor) of the mobile terminal.

At S202, the operating system identifies an internal running scenario of the target application according to the at least one system event.

The internal running scenario refers to a scenario of the target application which is currently running in the foreground.

At S203, the operating system acquires a strategy for performance improvement corresponding to the internal running scenario.

The strategy for performance improvement refers to a strategy for resource allocation which is used to improve running performance of the running target application, such as a strategy for CPU resource adjustment, a strategy for graphics processing unit (GPU) resource adjustment, a strategy for memory-and-bandwidth resource adjustment, a strategy for disk resource adjustment, and a strategy for network resource adjustment, which is not limited herein.

As an implementation, the operating system can query a preset mapping relationship between internal running scenarios of the target application and system events, and acquire the internal running scenario according to the currently detected system event.

The mapping relationship can include a correspondence between various types of system events and internal running scenarios, and can also include a correspondence between multiple system events of the same type and internal running scenarios. One system event can correspond to one internal running scenario, alternatively, multiple system events can correspond to one internal running scenario.

As an implementation, the internal running scenarios of the target application include scenario 1, scenario 2, scenario 3, scenario 4, scenario 5, and scenario 6. When scenario 1 of the target application is running in the foreground, the system event that the mobile terminal can detect includes system event 1 and system event 2. When scenario 2 of the target application is running in the foreground, the system event that the mobile terminal can detect includes system event 3 and system event 4. When scenario 3 of the target application is running in the foreground, the system event that the mobile terminal can detect includes system event 5. When scenario 4 of the target application runs in the foreground, the system event that the mobile terminal can detect includes system event 6. When scenario 5 of the target application is running in the foreground in the foreground, the system event that the mobile terminal can detect includes system event 7. When scenario 6 of the target application is running in the foreground, the system event that the mobile terminal can detect includes system event 8. As such, the mapping relationship between internal running scenarios of the target application and system events can be illustrated in Table 1 below.

TABLE 1

| Internal running scenario of the target application | System event |
| --- | --- |
| scenario 1 | system event 1 and system event 2 |
| scenario 2 | system event 3 and system event 4 |
| scenario 3 | system event 5 |
| scenario 4 | system event 6 |
| scenario 5 | system event 7 |
| scenario 6 | system event 8 |

Further, the operating system can acquire the strategy for performance improvement corresponding to the identified internal running scenario by querying a preset mapping relationship between internal running scenarios of the target application and strategies for performance improvement. The mapping relationship can be provided by the developer of the target application based on big data analysis; or the mapping relationship can be formed based on good strategies, which is obtained by the manufacturer of the mobile terminal through data analysis based on usage data collected in the background, and then the mapping relationship pushed to the mobile terminal; or the mapping relationship between internal running scenarios and strategies can be formed based on good strategies, which is optimized by the mobile terminal based on data learning algorithms such as artificial intelligence and integrates an actual running status of the target application running on the mobile terminal and a usage status of internal system resources. How to form the mapping relationship is not limited herein.

As can be seen the operating system can quickly and accurately identify the current internal running scenario of the target application based on the currently detected system event, and then acquire the strategy for performance improvement adapted to the internal running scenario, which is conducive to improving real-time performance and accuracy of system resource allocation when the mobile terminal runs the internal running scenario of the target application.

At S204, the operating system adjusts allocation of system resources of the target application according to the strategy for performance improvement.

As an implementation, the system resources include at least one of the following resources of the mobile terminal: CPU resources, GPU resources, memory-and-bandwidth resources, disk resources, or network resources. The network resources include network resources of a data network of the mobile terminal, network resources of a wireless fidelity (Wi-Fi) network, and control parameters of a Bluetooth module.

When the system resources are at least one of CPU resources, GPU resources, memory-and-bandwidth resources, or disk resources, the operating system can communicate with the kernel layer of the operating system space through direct communication to adjust allocation of the system resources. The direct communication refers to communicating directly through an abstract API.

When the system resources are network resources, the operating system can communicate with the kernel layer of the operating system space through indirect communication to adjust allocation of the system resources. The indirect communication refers to communicating indirectly by invoking a proxy service. As an implementation, a Wi-Fi subsystem or data network subsystem in the network resources and the operating system do not run in the same system, then the operating system needs to use some proxies to indirectly access these system resources. A Wi-Fi proxy service is provided in the operating system, and indirect communication with the Wi-Fi subsystem can be implemented by invoking an interface of the proxy service.

As can be seen, in implementations, when the operating system of the mobile terminal detects that the target application is running in the foreground of the mobile terminal, the operating system first acquires at least one system event associated with the target application. The operating system then identifies the internal running scenario of the target application according to the at least one system event. Thereafter, the operating system acquires the strategy for performance improvement corresponding to the internal running scenario. At last, the operating system adjusts allocation of system resources of the target application according to the strategy for performance improvement. Because the system event can be directly detected by the operating system, there is no need for the operating system to receive information of the target application through a dedicated channel to generate the strategy for performance improvement, that is, the internal running scenario of the target application can be directly identified and optimized exclusively by the operating system. In this way, signaling overhead can be reduced, time-consuming of optimization can be shortened, and the mobile terminal can control allocation of system resources of the target application in real-time and more efficiently.

As an implementation, the target application includes a camera application, and an internal running scenario of the camera application includes at least one of: entering a preview interface, preview, auto focus, photographing and saving, switching between portrait and landscape, location based augmented reality (AR), panorama mode, or exiting.

In this implementation, by subdividing the internal operation scenarios of the target application, performance optimization of the target application can be more refined, and overall performance of running the target application by the mobile terminal can be improved.

As an implementation, the at least one system event includes a touch screen event, the touch screen event includes an event of touching a running interface of the target application, and the touch event includes touch position information. Identify the internal running scenario of the target application according to the at least one system event as follows. A selected function of the target application is determined according to the touch position information. The internal running scenario of the target application is determined according to the selected function.

As an implementation, taking a photo preview interface of the camera application as an example, the selected functions may include autofocus, mode selection, focus adjustment, photographing and saving, etc., which are not limited here.

As can be seen, in this implementation, when the operating system detects a touch event, the operating system can synchronously identify the internal running scenario of the target application, which has high stability, and is convenient and fast.

As an implementation, the at least one system event includes a touch screen event, the touch screen event includes an event of switching screen states of a running interface of the target application, and the screen states include a portrait state and a landscape state. Identify the internal running scenario of the target application according to the at least one system event as follows. Determine the internal running scenario of the target application is a scenario of switching between portrait and landscape according to the event of switching screen states of the running interface of the target application.

As can be seen, in this implementation, in response to detecting the touch screen event, the operating system can synchronously identify the internal running scenario of the target application, which has high stability, and is convenient and fast.

As an implementation, the at least one system event includes a key event, the key event includes an event of pressing a preset physical key of the mobile terminal. Identify the internal running scenario of the target application according to the at least one system event as follows. A preset function of the target application associated with the preset physical key is determined according to the event of pressing a preset physical key. The internal running scenario of the target application is determined to be a scenario of switching between portrait and landscape according to the preset function.

The physical keys can include volume+ key, volume− key, home key, power button, etc., which are not limited here.

As an implementation, when the target application is a camera application and the camera application is running in a preview mode, the volume+ key can be associated with the focus adjustment function. Then the operating system can determine that the internal running scenario is the preview scenario when the operating system detects that the user presses the volume+ key to adjust the focus.

As can be seen, in this implementation, when the operating system detects the event of pressing a preset physical key, the operating system can synchronously identify the internal running scenario of the target application, which has high stability, and is convenient and fast.

As an implementation, the at least one system event includes a sensor event. Identify the internal running scenario of the target application according to the at least one system event as follows. Identify the internal running scenario of the target application according to the sensor event.

As an implementation, the sensor event includes at least one of: enabling a GPS of the mobile terminal, enabling an acceleration sensor of the mobile terminal, or enabling a gravity sensor (G-sensor) of the mobile terminal.

As an implementation, for a panorama mode of the camera application, the mobile phone needs to move up and down, or left and right. At this time, sensors such as the G-sensor will also have corresponding readings. During this movement, the operating system can formulate a strategy for performance improvement according to the current running scenario, as such, thus operation smoothness can be improved when the user takes photos in the camera panorama mode, thus operation is smoother and the camera application will not stuck.

As can be seen, in this implementation, when the operating system detects the sensor event, the operating system can synchronously identify the internal running scenario of the target application, which has high stability, and is convenient and fast.

As an implementation, the at least one system event includes an event of calling an API. Identify the internal running scenario of the target application according to the at least one system event as follows. Identify the internal running scenario of the target application according to the event of calling an API.

As an implementation, the event of calling an API includes at least one of: a remote procedure call (RPC), a structured query language (SQL), or file information transmission.

As can be seen, in this implementation, the event of calling an API can be detected directly by the operating system, so that the operating system can identify the internal running scenario of the target application quickly and optimize the internal running scenario specifically, which can improve refinement and efficiency of performance optimization.

Figure 3:
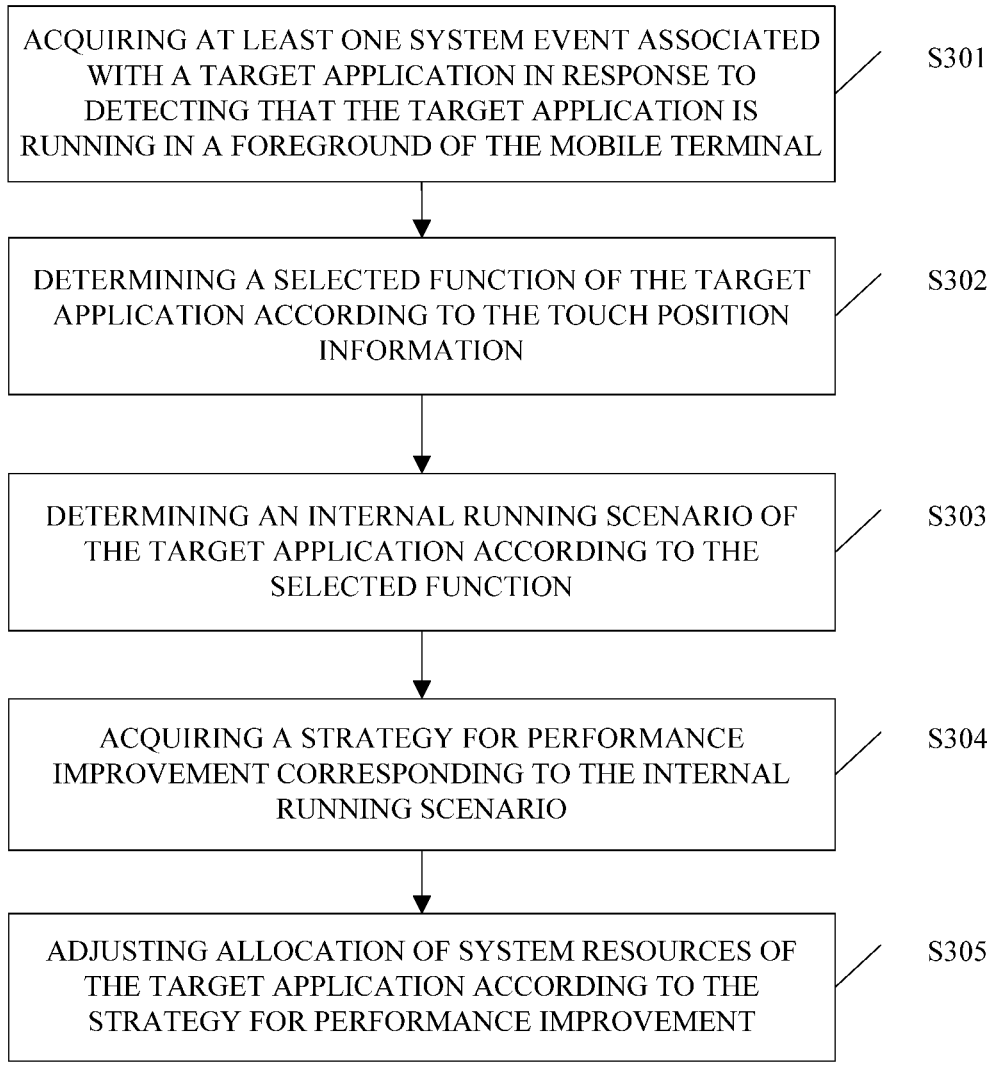
FIG. 3 is a schematic flow chart illustrating a method for resource allocation according to implementations.

Similar to implementations illustrated in FIG. 2, FIG. 3 is a schematic flow chart illustrating a method for resource allocation in a mobile terminal according to implementations. The mobile terminal has an operating system and at least one application. As illustrated in FIG. 3, the method for resource allocation includes the following.

At S301, in response to detecting that a target application is running in a foreground of the mobile terminal, the operating system acquires at least one system event associated with the target application. The at least one system event includes a touch screen event, the touch screen event includes an event of touching a running interface of the target application, and the touch event includes touch position information.

At S302, the operating system determines a selected function of the target application according to the touch position information.

At S303, the operating system determines an internal running scenario of the target application according to the selected function.

At S304, the operating system acquires a strategy for performance improvement corresponding to the internal running scenario.

At S305, the operating system adjusts allocation of system resources of the target application according to the strategy for performance improvement.

As can be seen, in implementations, when the operating system of the mobile terminal detects that the target application is running in the foreground of the mobile terminal, the operating system first acquires at least one system event associated with the target application. The operating system then identifies the internal running scenario of the target application according to the at least one system event. Thereafter, the operating system acquires the strategy for performance improvement corresponding to the internal running scenario. At last, the operating system adjusts allocation of system resources of the target application according to the strategy for performance improvement. Because the system event can be directly detected by the operating system, there is no need for the operating system to receive information of the target application through a dedicated channel to generate the strategy for performance improvement, that is, the internal running scenario of the target application can be directly identified and optimized exclusively by the operating system. In this way, signaling overhead can be reduced, time-consuming of optimization can be shortened, and the mobile terminal can control allocation of system resources of the target application in real-time and more efficiently.

In addition, when the operating system detects a touch event, the operating system can synchronously identify the internal running scenario of the target application, which has high stability, and is convenient and fast.

Figure 4:
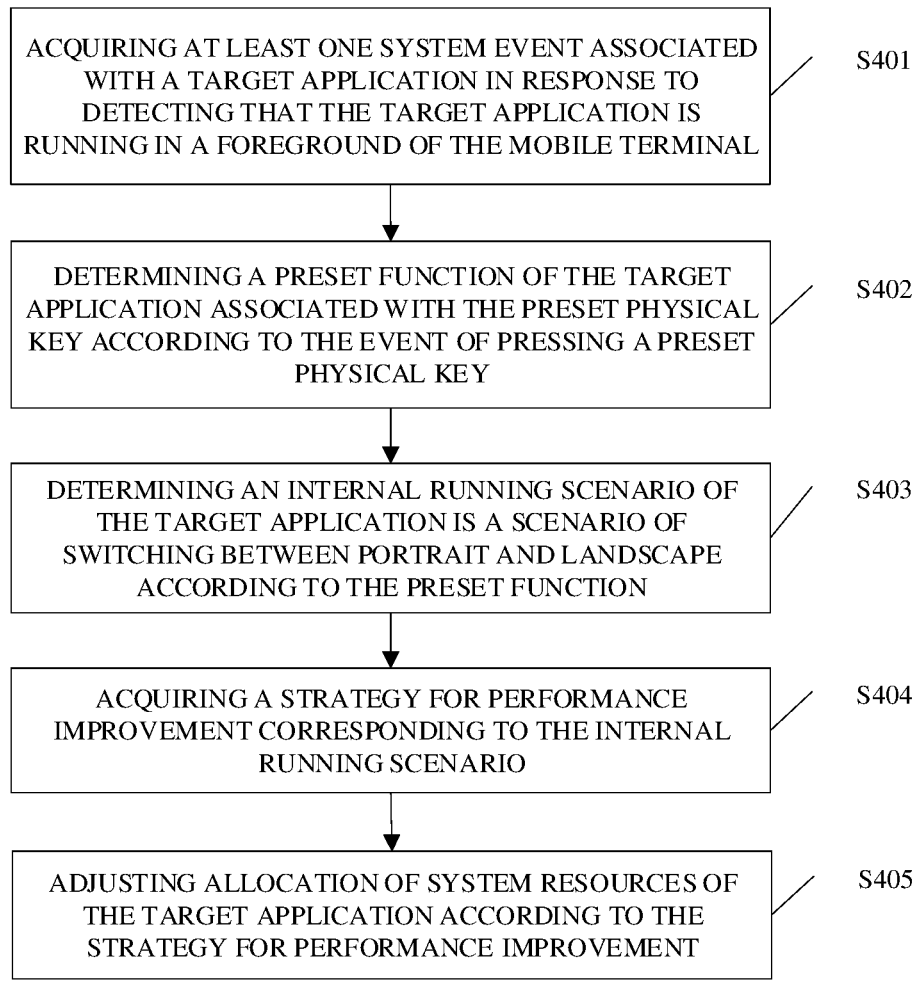
FIG. 4 is a schematic flow chart illustrating a method for resource allocation according to implementations.

Similar to implementations illustrated in FIG. 2, FIG. 4 is a schematic flow chart illustrating a method for resource allocation in a mobile terminal according to implementations. The mobile terminal has an operating system and at least one application. The operating system includes a management module, multiple strategy modules, and a data connection management module, and each strategy module is used to determine a strategy for performance improvement of an application in at least one application of the same application type. The target application includes a data connection module. A package of scenario data includes a scenario identifier and key performance parameters of the target application, and the package of scenario data includes a data format identifier. As illustrated in FIG. 4, the method for resource allocation includes the following.

At S401, in response to detecting that a camera application is running in a foreground of the mobile terminal, the operating system acquires at least one system event associated with the camera application. The at least one system event includes a key event, and the key event includes an event of pressing a preset physical key of the mobile terminal.

At S402, the operating system determines a preset function of the target application associated with the preset physical key according to the event of pressing a preset physical key.

At S403, the operating system determines that the internal running scenario of the target application is a scenario of switching between portrait and landscape according to the preset function.

At S404, the operating system acquires a strategy for performance improvement corresponding to the scenario of switching between portrait and landscape.

At S405, the operating system adjusts allocation of system resources of the camera application according to the strategy for performance improvement.

As can be seen, in implementations, when the operating system of the mobile terminal detects that the target application is running in the foreground of the mobile terminal, the operating system first acquires at least one system event associated with the target application. The operating system then identifies the internal running scenario of the target application according to the at least one system event. Thereafter, the operating system acquires the strategy for performance improvement corresponding to the internal running scenario. At last, the operating system adjusts allocation of system resources of the target application according to the strategy for performance improvement. Because the system event can be directly detected by the operating system, there is no need for the operating system to receive information of the target application through a dedicated channel to generate the strategy for performance improvement, that is, the internal running scenario of the target application can be directly identified and optimized exclusively by the operating system. In this way, signaling overhead can be reduced, time-consuming of optimization can be shortened, and the mobile terminal can control allocation of system resources of the target application in real-time and more efficiently.

In addition, by subdividing the internal operation scenarios of the target application, performance optimization of the target application can be more refined, and overall performance of running the target application by the mobile terminal can be improved.

In addition, when the operating system detects the event of pressing a preset physical key, the operating system can synchronously identify the internal running scenario of the target application, which has high stability, and is convenient and fast.

Figure 5:
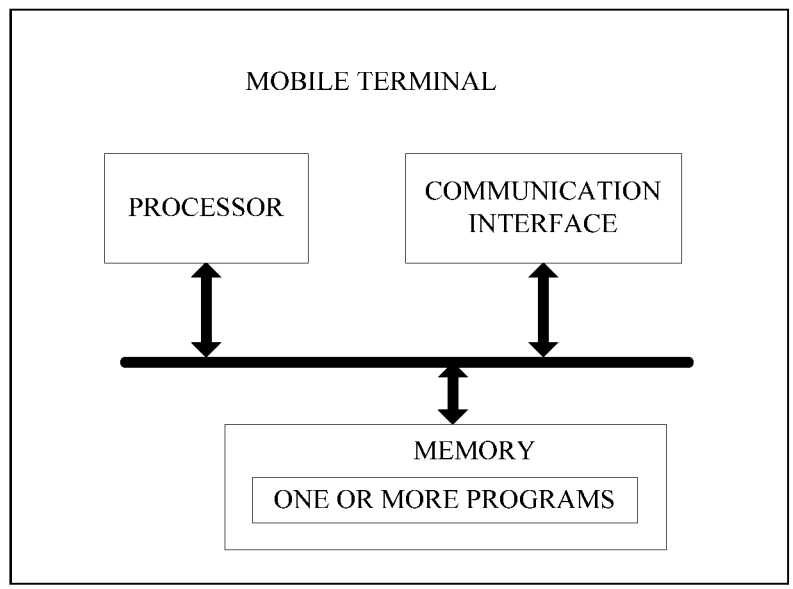
FIG. 5 is a schematic structural diagram illustrating a mobile terminal according to implementations.

In view of implementations illustrated in FIG. 2, FIG. 3, and FIG. 4, reference can be made to FIG. 5. FIG. 5 is a schematic structural diagram illustrating a mobile terminal according to implementations. The mobile terminal has one or more application programs and an operating system. As illustrated in FIG. 5, the mobile terminal includes a processor, a memory, a communication interface, and one or more programs. The one or more programs are different from the one or more application programs. The one or more programs are stored in the memory and configured to be executed by the processor, and the one or more programs include instructions for performing the following.

When the operating system detects that a target application is running in a foreground of the mobile terminal, at least one system event associated with the target application is acquired. An internal running scenario of the target application is identified according to the at least one system event. A strategy for performance improvement corresponding to the internal running scenario is acquired. Allocation of system resources of the target application is adjusted according to the strategy for performance improvement.

As can be seen, in implementations, when the operating system of the mobile terminal detects that the target application is running in the foreground of the mobile terminal, the operating system first acquires at least one system event associated with the target application. The operating system then identifies the internal running scenario of the target application according to the at least one system event. Thereafter, the operating system acquires the strategy for performance improvement corresponding to the internal running scenario. At last, the operating system adjusts allocation of system resources of the target application according to the strategy for performance improvement. Because the system event can be directly detected by the operating system, there is no need for the operating system to receive information of the target application through a dedicated channel to generate the strategy for performance improvement, that is, the internal running scenario of the target application can be directly identified and optimized exclusively by the operating system. In this way, signaling overhead can be reduced, time-consuming of optimization can be shortened, and the mobile terminal can control allocation of system resources of the target application in real-time and more efficiently.

As an implementation, the target application includes a camera application, and an internal running scenario of the camera application includes at least one of: entering a preview interface, preview, auto focus, photographing and saving, switching between portrait and landscape, location based AR, panorama mode, or exiting.

As an implementation, the at least one system event includes a touch screen event, the touch screen event includes an event of touching a running interface of the target application, and the touch event includes touch position information. In terms of identifying the internal running scenario of the target application according to the at least one system event, the one or more programs include instructions for performing the following. A selected function of the target application is determined according to the touch position information. The internal running scenario of the target application is determined according to the selected function.

As an implementation, the at least one system event includes a touch screen event, the touch screen event includes an event of switching screen states of a running interface of the target application, and the screen states include a portrait state and a landscape state. In terms of identifying the internal running scenario of the target application according to the at least one system event, the one or more programs include instructions for performing the following. That the internal running scenario of the target application is a scenario of switching between portrait and landscape according to the event of switching screen states is determined.

As an implementation, the at least one system event includes a key event, and the key event includes an event of pressing a preset physical key of the mobile terminal. In terms of identifying the internal running scenario of the target application according to the at least one system event, the one or more programs include instructions for performing the following. A preset function of the target application associated with the preset physical key is determined according to the event of pressing a preset physical key. The internal running scenario of the target application is determined to be a scenario of switching between portrait and landscape according to the preset function.

As an implementation, the at least one system event includes a sensor event. In terms of identifying the internal running scenario of the target application according to the at least one system event, the one or more programs include instructions for performing the following. The internal running scenario of the target application is identified according to the sensor event.

As an implementation, the sensor event includes at least one of: enabling a GPS of the mobile terminal, enabling an acceleration sensor of the mobile terminal, or enabling a gravity sensor (G-sensor) of the mobile terminal.

As an implementation, the at least one system event includes an event of calling an API. In terms of identifying the internal running scenario of the target application according to the at least one system event, the one or more programs include instructions for performing the following. The internal running scenario of the target application is identified according to the event of calling an API.

The foregoing solution of the implementations is mainly described from the viewpoint of execution process of the method. It can be understood that, in order to implement the above functions, the mobile terminal and the sever include hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations is schematic, and is merely a logical function division, and there may be other division manners in actual implementation.

Figure 6:
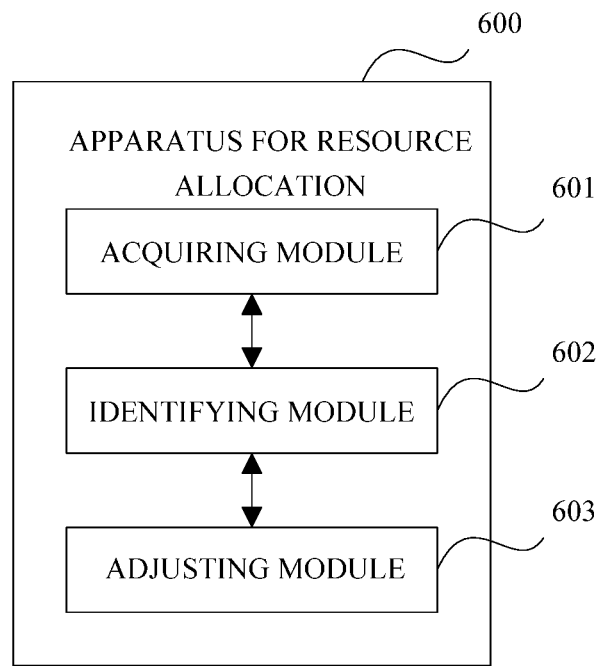
FIG. 6 is a block diagram illustrating an apparatus for resource allocation according to implementations.

In the case of the integrated unit, FIG. 6 is a block diagram illustrating an apparatus for resource allocation according to implementations. The apparatus for resource allocation apparatus for resource allocation is applicable to a mobile terminal and includes an acquiring module 601, an identifying module 602, and an adjusting module 603.

The acquiring module 601 is configured to acquire at least one system event associated with a target application in response to detecting that the target application is running in a foreground of the mobile terminal.

The identifying module 602 is configured to identify an internal running scenario of the target application according to the at least one system event.

The acquiring module 601 is further configured to acquire a strategy for performance improvement corresponding to the internal running scenario.

The adjusting module 603 is configured to adjust allocation of system resources of the target application according to the strategy for performance improvement.

As can be seen, in implementations, when the operating system of the mobile terminal detects that the target application is running in the foreground of the mobile terminal, the operating system first acquires at least one system event associated with the target application. The operating system then identifies the internal running scenario of the target application according to the at least one system event. Thereafter, the operating system acquires the strategy for performance improvement corresponding to the internal running scenario. At last, the operating system adjusts allocation of system resources of the target application according to the strategy for performance improvement. Because the system event can be directly detected by the operating system, there is no need for the operating system to receive information of the target application through a dedicated channel to generate the strategy for performance improvement, that is, the internal running scenario of the target application can be directly identified and optimized exclusively by the operating system. In this way, signaling overhead can be reduced, time-consuming of optimization can be shortened, and the mobile terminal can control allocation of system resources of the target application in real-time and more efficiently.

As an implementation, the target application includes a camera application, and an internal running scenario of the camera application includes at least one of: entering a preview interface, preview, auto focus, photographing and saving, switching between portrait and landscape, location based AR, panorama mode, or exiting.

As an implementation, the at least one system event includes a touch screen event, the touch screen event includes an event of touching a running interface of the target application, and the touch event includes touch position information. The identifying module 602 is further configured to: determine a selected function of the target application according to the touch position information; determine the internal running scenario of the target application according to the selected function.

As an implementation, the at least one system event includes a touch screen event, the touch screen event includes an event of switching screen states of a running interface of the target application, and the screen states include a portrait state and a landscape state. The identifying module 602 is further configured to: determine the internal running scenario of the target application is a scenario of switching between portrait and landscape according to the event of switching screen states.

As an implementation, the at least one system event includes a key event, and the key event includes an event of pressing a preset physical key of the mobile terminal. the identifying module 602 is further configured to: determine a preset function of the target application associated with the preset physical key according to the event of pressing a preset physical key; determine the internal running scenario of the target application is a scenario of switching between portrait and landscape according to the preset function.

As an implementation, the at least one system event includes a sensor event. The identifying module 602 is further configured to identify the internal running scenario of the target application according to the sensor event.

As an implementation, the sensor event includes at least one of: enabling a GPS of the mobile terminal, enabling an acceleration sensor of the mobile terminal, or enabling a gravity sensor (G-sensor) of the mobile terminal.

As an implementation, the at least one system event includes an event of calling an API. The identifying module 602 is further configured to identify the internal running scenario of the target application according to the event of calling an API.

The acquiring module 601 can be an application processor and a memory. The identifying module 602 and the adjusting module 603 can be a processor.

Implementations further provide a non-transitory computer readable storage medium. The computer readable storage medium is configured to store computer programs for electronic data interchange. The computer programs are operable with a computer to execute part of or all the operations of any of the methods for resource allocation of a user described in the above method implementations. The computer includes the mobile terminal.

Implementations further provide a computer program product. The computer program product includes a non-transitory computer readable storage medium that stores computer programs. The computer programs are operable with a computer to execute part of or all the operations of any of the methods for resource allocation of a user described in the above method implementations. The computer programs can be a software installation package. The computer includes the mobile terminal.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are example implementations and the actions and modules involved are not necessarily essential to the present disclosure.

In the foregoing implementations, the description of each implementation has its own emphasis. For the parts not described in detail in one implementation, reference may be made to related descriptions in other implementations.

In implementations, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations may be integrated into one processing unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product. Based on such understanding, the technical solutions essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skilled in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource allocation in a mobile terminal, the mobile terminal having an operating system and at least one application, the method being performed by the operating system and comprising:
   acquiring at least one system event associated with a target application in response to detecting that the target application is running in a foreground of the mobile terminal;
   identifying an internal running scenario of the target application according to the at least one system event;
   acquiring a strategy for performance improvement corresponding to the internal running scenario; and
   adjusting allocation of system resources of the target application according to the strategy for performance improvement;
   wherein the at least one system event comprises a touch screen event, wherein the touch screen event comprises an event of touching a running interface of the target application, and wherein the touch screen event comprises touch position information,
   wherein identifying the internal running scenario of the target application according to the at least one system event comprises:
      determining a selected function of the target application according to the touch position information; and
      determining the internal running scenario of the target application according to the selected function,
   wherein the system resources comprise at least one of CPU resources, GPU resources, memory-and-bandwidth resources, disk resources, or network resources, and
   wherein adjusting the allocation of system resources of the target application comprises:
      communicating with a kernel layer of an operating system space through direct communication to adjust allocation of the system resources, wherein the direct communication refers to communicating directly through an abstract application programming interface (API) when the system resources are at least one of CPU resources, GPU resources, memory-and-bandwidth resources, or disk resources; and
      communicating with the kernel layer of the operating system space through indirect communication to adjust allocation of the system resources, wherein the indirect communication refers to communicating indirectly by invoking a proxy service when the system resources are network resources.

2. The method of claim 1, wherein the target application comprises a camera application, and an internal running scenario of the camera application comprises at least one of: entering a preview interface, preview, auto focus, photographing and saving, switching between portrait and landscape, location based augmented reality (AR), panorama mode, or exiting.

3. The method of claim 1, wherein the system resources include at least one of: central processing unit (CPU) resources, graphics processing unit (GPU) resources, memory-and-bandwidth resources, disk resources, or network resources, and wherein the network resources comprise network resources of a data network, network resources of a wireless fidelity (Wi-Fi) network, or control parameters of a Bluetooth module of the mobile terminal.

4. A mobile terminal comprising:
   at least one processor; and
   at least one memory, coupled to the at least one processor and storing at least one computer executable instruction thereon which, when executed by the at least one processor, causes the at least one processor to:
      acquire at least one system event associated with a target application in response to detecting that the target application is running in a foreground of the mobile terminal;
      identify an internal running scenario of the target application according to the at least one system event, wherein the at least one system event comprises a touch screen event, wherein the touch screen event comprises an event of touching a running interface of the target application, and wherein the touch screen event comprises touch position information;
acquire a strategy for performance improvement corresponding to the internal running scenario;
adjust allocation of system resources of the target application according to the strategy for performance improvement;
determine a selected function of the target application according to the touch position information; and
determine the internal running scenario of the target application according to the selected function,
wherein the system resources comprise at least one of CPU resources, GPU resources, memory-and-bandwidth resources, disk resources, or network resources, and
wherein to adjust the allocation of system resources of the target application comprises:
communicate with a kernel layer of an operating system space through direct communication to adjust allocation of the system resources, wherein the direct communication refers to communicating directly through an abstract application programming interface (API) when the system resources are at least one of CPU resources, GPU resources, memory-and-bandwidth resources, or disk resources; and
communicate with the kernel layer of the operating system space through indirect communication to adjust allocation of the system resources, wherein the indirect communication refers to communicating indirectly by invoking a proxy service when the system resources are network resources.

5. The mobile terminal of claim 4, wherein the target application comprises a camera application, and an internal running scenario of the camera application comprises at least one of: entering a preview interface, preview, auto focus, photographing and saving, switching between portrait and landscape, location based augmented reality (AR), panorama mode, or exiting.

6. The mobile terminal of claim 4, wherein the system resources include at least one of: central processing unit (CPU) resources, graphics processing unit (GPU) resources, memory-and-bandwidth resources, disk resources, or network resources, and wherein the network resources comprise network resources of a data network, network resources of a wireless fidelity (Wi-Fi) network, and control parameters of a Bluetooth module of the mobile terminal.

7. A non-transitory computer readable storage medium storing a computer program which, when executed by a processor, causes the processor to:
acquire at least one system event associated with a target application, when an operating system of a mobile terminal detects that the target application is running in a foreground of the mobile terminal;
identify an internal running scenario of the target application according to the at least one system event, wherein the at least one system event comprises a touch screen event, wherein the touch screen event comprises an event of touching a running interface of the target application, and wherein the touch screen event comprises touch position information;
acquire a strategy for performance improvement corresponding to the internal running scenario;
adjust allocation of system resources of the target application according to the strategy for performance improvement;
determine a selected function of the target application according to the touch position information; and
determine the internal running scenario of the target application according to the selected function,
wherein the system resources comprise at least one of CPU resources, GPU resources, memory-and-bandwidth resources, disk resources, or network resources, and
wherein to adjust the allocation of system resources of the target application comprises:
communicate with a kernel layer of the operating system space through direct communication to adjust allocation of the system resources, wherein the direct communication refers to communicating directly through an abstract application programming interface (API) when the system resources are at least one of CPU resources, GPU resources, memory-and-bandwidth resources, or disk resources; and
communicate with the kernel layer of the operating system space through indirect communication to adjust allocation of the system resources, wherein the indirect communication refers to communicating indirectly by invoking a proxy service when the system resources are network resources.

\* \* \* \* \*